June 9, 1942.  L. A. YOUNG  2,286,047
CUTTING IMPLEMENT
Filed April 11, 1940
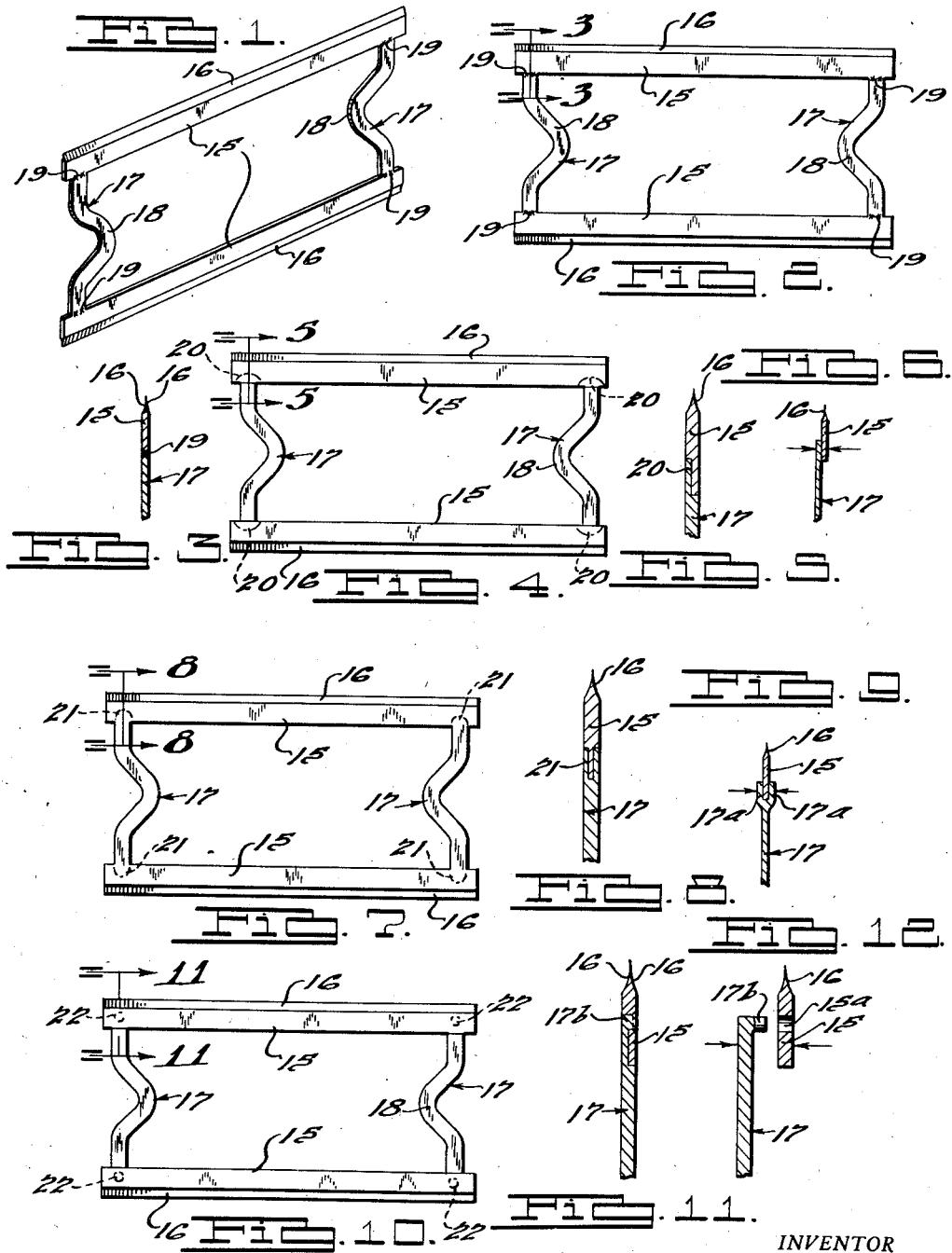
INVENTOR
Leonard A. Young.
BY Dike, Calver & Gray
ATTORNEYS.

Patented June 9, 1942

2,286,047

UNITED STATES PATENT OFFICE 2,286,047

CUTTING IMPLEMENT

Leonard A. Young, Detroit, Mich.

Application April 11, 1940, Serial No. 329,019

7 Claims. (Cl. 30—353)

The present invention relates to cutting implements such, for example, as razor blades and the like.

One of the objects of the invention is to provide a skeleton blade of either the single or double edge type wherein substantial savings in material and cost of manufacture are effected.

Another object of the invention is to provide an improved blade of the double edge type in which only the cutting edge portions of the blade need be formed from high grade steel, thus materially reducing the cost of production.

A further object of the invention is to provide an improved razor blade of the foregoing character in which the cutting members or portions of the blade are formed from Swedish steel wire, stainless steel wire or the like and in which the remaining portions of the skeleton blade are formed from relatively soft ordinary wire.

Another object of the invention is to provide a blade consisting of one or two cutting members or portions having hollow ground cutting edges and struts or links for rigidly interconnecting the cutting members in any suitable manner, as by means of welding, riveting or the like.

A still further object is to provide a blade of improved character for use with razors or blade holders of a wide range of styles or types.

The above and other objects of the invention will appear from the following description and appended claims when considered in connection with the accompanying drawing forming a part of this specification wherein like reference characters designate corresponding parts in the several views.

In said drawing:

Fig. 1 is a perspective view of a blade or cutting implement embodying one form of the present invention.

Fig. 2 is an elevational view of the article of Fig. 1.

Fig. 3 is an enlarged fragmentary section taken substantially along the line 3—3 of Fig. 2, in the direction of the arrows.

Fig. 4 is an elevational view of a modified form of blade embodying the present invention.

Fig. 5 is a considerably enlarged fragmentary section taken substantially along the line 5—5 of Fig. 4, looking in the direction of the arrows.

Fig. 6 is a view of the parts shown in Figs. 4 and 5 prior to the welding operation for connecting the parts together.

Fig. 7 is an elevational view of a further modified form of blade or cutting implement embodying the present invention.

Fig. 8 is a greatly enlarged fragmentary section taken substantially along the line 8—8 of Fig. 7, in the direction of the arrows.

Fig. 9 is a view similar to Fig. 6 but showing the relationship of the parts of Figs. 7 and 8 prior to the welding operation for securing the parts together.

Fig. 10 is an elevational view similar to Figs. 2, 4 and 7 and showing a further modified form of the present invention.

Fig. 11 is a greatly enlarged fragmentary sectional view taken substantially along the line 11—11 of Fig. 10, looking in the direction of the arrows; and Fig. 12 is a view of the parts shown in Figs. 10 and 11, taken prior to the assembly of the parts.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

By virtue of the present invention it is possible to produce cutting implements such, for example, as single or double edge safety razor blades, there being shown, merely for purposes of illustration, several forms of blades of the double edge type. It is to be understood, however, that the invention contemplates the production of blades of the single cutting edge type as well.

The method of manufacturing such razor blades is no part of the present invention since the blades may be made by any desired method.

One of the principal advantages of the so-called skeleton type of blade herein disclosed lies in the fact that only the cutting members or portions of the blade in which the cutting edges need be made are formed from high grade steel wire such, for example, as Swedish steel wire, stainless steel wire, or the like, the remaining portions of the skeleton cutting implement or blade being formed from relatively softer metals or wire of various kinds. Moreover, by virtue of the present invention and by reason of the use of wire of stainless steel or Swedish steel, substantial savings in material costs are made. In addition to such savings in costs, there is a further saving in that a considerably smaller amount of this high priced material is used in the blades of the present invention than is used in previously known blades where the entire blade was formed from a strip of such more costly steel and then had to be stamped or otherwise cut to separate the individual blades from the strip. Those portions of the blades of the present invention, namely the struts, links, or cross members which serve to hold the cutting portions or members of the blade together, are, as stated above, formed from relatively soft ordinary steel wire which costs substantially less than the wire used in forming the cutting edge portions. Thus, assuming that there is about an equal amount of the cutting blade material and of the material forming the remaining portions of the skeleton type blade, the total average cost of material would amount to but approximately .055 cent per pound. It will be appreciated therefore that as the result of the present invention, high grade razor blades can be produced at relatively low cost and with very inconsequential loss of material in such production.

Referring now particularly to Figs. 1, 2 and 3 of the drawing, the skeleton type of blade therein shown comprises a pair of spaced substantially parallel cutting members or portions 15 formed from Swedish or stainless steel wire or the like. The cutting edges 16 of the blade portions 15 are preferably hollow ground as best seen in Fig. 3. The cutting members 15 of the blades, as shown, are connected together adjacent their opposite ends by means of cross members, links, or struts, shown as a whole at 17. As stated above, these members are formed preferably from ordinary relatively soft wire. In the present embodiment the connecting members or struts are provided with centrally disposed inwardly bowed or curved portions 18, this for the purpose of providing a skeleton blade which is capable of being used with various types of safety razors, such for example as those known to the trade as Gillette safety razors. In the present form, the opposite ends of the struts or interconnecting members 17 are preferably butt welded at 19 to the inner side edges of the blade or cutting portions 15. It is to be noted that, as shown, the butt welds, as well as the ends of the struts 17, are located or positioned adjacent the opposite ends of the cutting members 15 but slightly inwardly from said ends.

It will be understood that the portions 15 and 17 of the skeleton blade are formed respectively from Swedish or stainless steel wire and ordinary relatively soft steel wire and that the struts are welded at their ends to the cutting members 15. Thereafter, the entire blade is placed in a suitable die press or similar pressure applying apparatus and flattened out in the form in which it is shown in Figs. 1, 2 and 3 of the drawing. If desired, the welding operation and that of shaping or forming the finished blade may take place simultaneously in the same apparatus, or by separate operations.

Referring now to Figs. 4, 5 and 6, it will be seen that the skeleton blade of these figures is generally similar to that of Figs. 1 to 3 inclusive, and that the difference between these two forms resides in the manner in which the struts or members 17 are permanently attached or connected to the cutting members 15. As herein shown, the means of attachment or connection of these members is performed in any convenient manner by a lap or butt welding operation or the application of pressure to the overlapping portions of the parts 15 and 17 in substantially the manner indicated by the arrows in Fig. 6 so as to effect or produce the welded joint 20 shown in Figs. 4 and 5. As in the preceding form, it is to be noted that the welds 20 are located adjacent to but slightly removed inwardly from the outer ends of the cutting members 15. As in the preceding form also, the skeleton blade of the present form of the invention is formed from wire, welded and shaped or flattened out as shown in the drawing to produce the finished blade, it being only necessary thereafter to produce the hollow ground cutting edges or portions 16.

In Figs. 7, 8 and 9, a razor blade similar to those of the preceding figures is shown. In the present modification embodying the invention the opposite ends of the wire from which the struts or cross members 17 are formed are preferably grooved or notched so as to receive the cutting members 15, as best seen in Fig. 9. The opposite ends of the wire strut members 17 have portions 17a which lie on opposite faces of the cutting member 15, one end only being shown in Fig. 9. The parts are welded at these points and pressure is applied so as to produce the structure shown in Figs. 7 and 8, the weld being indicated at the points 21 in these figures. As shown, the welds 21 are located adjacent opposite ends of the cutting members 15 but are spaced slightly inwardly of such ends.

A further modified form of the present invention is shown in Figs. 10 to 12 inclusive. In this form of the invention, the parts 15 and 17 are formed in substantially the same manner as the corresponding parts of the preceding views, the difference between the present form and those preceding it being in the particular kind of joint or connection which serves to secure the members 15 and 17 together as a permanent unit. As seen in Fig. 12, the struts or connecting links 17 are provided at their opposite ends with laterally projecting or offset portions 17b. The cutting members or portions 15 of the blade are provided at points adjacent their opposite ends with holes or recesses 15a which are adapted to receive the offsets or projections 17b. The parts are assembled as suggested by Fig. 12 and upon completion of the pressing operations a joint or joints are formed as shown in Figs. 10 and 11. These joints are designated by the reference character 22 appearing in Fig. 10. As shown in this form of the invention, the points of location of the joints are adjacent to but slightly removed inwardly from the opposite ends of the cutting edge carrying members 15 of the skeleton blade. If desired, this mechanical joining of the parts may be used without any welding of the parts since the distortion of the metal when the pressure is applied thereto is sufficient to retain the parts in their assembled positions. It is to be understood, however, that this mechanical joint can be reinforced or supplemented by welding of the parts. These cutting edges 16, as in the previous forms, are hollow ground after the welding and shaping operation has been performed.

From the foregoing it will be seen that I have evolved an improved type of razor blade or cutter of skeleton form or type in which hollow ground cutting edges are formed in edge portions fabricated from Swedish or stainless steel wire, or the like, and in which the connecting links, struts or the like which permanently secure the cutting members of the blade in fixed position on said struts, are preferably formed from relatively soft ordinary wire having a considerably lower cost than said Swedish or stainless steel wire. Moreover, it will be understood that the skeleton type blade embodying the present invention may be so formed as to adapt it for use with a wide range of razor blade holders of well known makes and types.

I claim:

1. A razor blade of the double edge type adapted for application to safety razors of standard makes, comprising a skeleton body formed from relatively soft wire and including a pair of spaced strut members, and a pair of spaced cutting members formed from tempered steel wire stock, said cutting members having hollow ground cutting edges, the opposite ends of said struts being welded to the inner opposed side edges of the cutting members at points located inwardly from the ends of said members.

2. A cutting implement or blade of the double edge type, comprising a skeleton body portion having strut members formed from relatively soft wire, and permanently connected cutting members formed from tempered steel wire stock, said strut members and said cutting members having overlapping portions welded together.

3. A razor blade of the double edge type, comprising a skeleton body portion having cross struts formed from relatively soft wire, and spaced cutting members welded to the opposite ends of said cross struts, said cutting members being formed from tempered steel wire stock.

4. A razor blade of the double edge type, comprising a skeleton body portion having cutting members formed from Swedish steel wire stock, and connecting links for the cutting members formed from relatively soft wire stock, the opposite ends of said connecting links being provided with grooves to receive the cutting members and to embrace the same when the parts are permanently secured together as a unit.

5. A razor blade of the double edge type, comprising a skeleton body portion having cutting members formed from Swedish steel wire stock, and connecting struts for the cutting members formed from relatively soft wire, the opposite ends of said connecting struts being provided with offset male members and the cutting members having female openings to receive said male members whereby the parts are permanently secured together.

6. A razor blade of the double edge type, comprising a skeleton body portion having cross struts formed from relatively soft wire, and spaced cutting members fixed to the opposite ends of said cross struts, said cutting members being formed from tempered steel stock.

7. A double edged razor blade comprising a skeleton body portion consisting of spaced metal struts located entirely within the area of the blade, and cutting members disposed substantially at right angles to said struts and permanently secured to the ends of the struts at points located inwardly from the ends of the cutting members, said struts being inwardly bowed in the plane of the blade and said struts being formed of substantially softer metal than that of said cutting members.

LEONARD A. YOUNG.